United States Patent Office 3,171,424
Patented Mar. 2, 1965

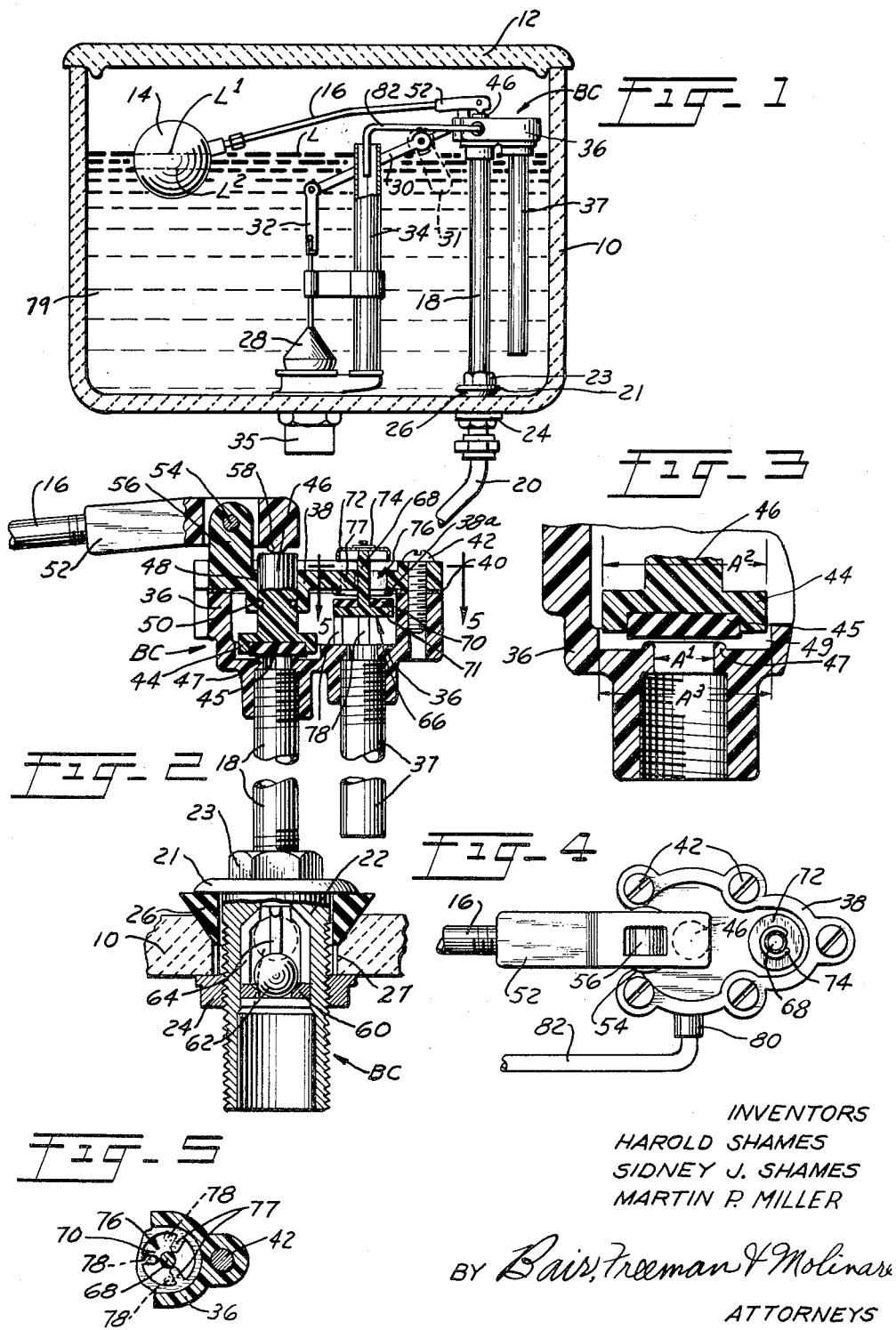

3,171,424
BALL COCK ASSEMBLY
Harold Shames, 5 Agnes Circle, and Sidney J. Shames, 19 Agnes Circle, both of Ardsley, N.Y., and Martin P. Miller, 6004 Netherland Ave., New York, N.Y.
Filed Apr. 1, 1963, Ser. No. 269,522
6 Claims. (Cl. 137—218)

Our invention relates to an improved type of ball cock assembly having novel float valve and anti-siphon valve features.

One object of the invention is to provide a float valve so constructed that it takes advantage of hydraulic multiplication to obtain a superior float valve seating operation.

Another object is to provide an improved float valve structure which provides, in association with the valve disc and valve seat thereof, a cylindrical chamber construction in which the valve disc acts as a piston of larger diameter than the valve seat to secure greater valve closing pressure than can be obtained with the usual type of float valve.

Still another object is to provide an improved combination float valve and anti-siphoning valve means which is characterized by simplicity and inexpensiveness of construction and by highly efficient and reliable operability.

A further object is to provide a ball cock assembly with improved anti-siphoning valving arrangements including a valve seat provided upstream of the float valve against which a valve closure element normally seats, whereby upon failure of water supply to the float valve, water from the flush tank can not siphon back into the water supply line.

Still a further object is to provide a flush tank ball cock assembly with improved anti-siphoning means that includes an anti-siphoning valve in the outlet portion of the float valve body which tends to be normally open to atmosphere within the flush tank when the float valve is closed, but which closes when the water flows through the float valve, thus deflecting the water into the discharge pipe from the float valve, such anti-siphoning valve functioning in cooperation with other means having a check valve and anti-siphoning characteristics under certain pressure conditions in the system so as to insure a positive and complete anti-siphoning action.

With these and other objects in view, our invention consists in the construction, arrangement and combination of the various parts of our ball cock assembly, whereby the objects above contemplated are attained, as hereinafter more fully set forth, pointed out in our claims and illustrated in detail on the accompanying drawing, wherein:

FIG. 1 is a vertical cross section through a flush tank showing our ball cock assembly mounted therein;

FIG. 2 is a fragmentary enlarged vertical sectional view through our ball cock assembly;

FIG. 3 is a fragmentary view showing a further enlargement of the float valve portion of the assembly;

FIG. 4 is an plan view of FIG. 2; and

FIG. 5 is a fragmentary sectional view on the line 5—5 of FIG. 2.

On the accompanying drawing we have used the reference numeral 10 to indicate a flush tank shown in vertical cross section in FIG. 1, and 12 the tank cover thereof. Our ball cock assembly is shown generally at BC.

The usual float 14 is provided having a float rod 16 extending therefrom for operating the float valve of the ball cock assembly as will hereinafter appear. The ball cock assembly further includes a supply shank 22 with which a supply pipe 20 is connected for supplying water to the flush tank 10 in the usual manner. The usual standpipe 18 is mounted in the upper end of the supply shank 22. The supply shank is of special construction as will hereinafter appear. It has a flange 21 and a hex portion 23 for holding the shank when screwing the standpipe 18 thereinto and for also holding the shank when a coupling nut 24 is screwed thereon in opposition to the usual cone washer 26, for sealing purposes, seated between the flange 21 and the edge of an opening 27 in the flush tank.

The flush tank 10 illustrated in FIG. 1 has the usual flush valve 28 actuated by a flush rod 30 provided with an actuating handle 31 on the outside of the tank. A link 32 operatively connects the flush rod to the flush valve. The usual overflow pipe 34 is provided terminating in a stool connection 35. The parts 28 to 35 form no part of our present invention since they are conventional.

Our ball cock assembly includes an upwardly opening, hollow, valve body 36 screwed onto the upper end of the standpipe 18 and having a discharge pipe 37 depending therefrom. The valve body 36 has an entry boss 80 with which the usual refill conduit 82 is connected. A cover plate 38 is mounted on the upper side of the hollow valve body 36 by means of screws 42, a suitable gasket 40 being interposed between the two.

A float valve comprising a float valve disc 44, a seal disc 45, of rubber or the like, carried thereby on the underside and extending therebelow, and a float valve stem 46 extending upwardly therefrom is provided. A raised float valve seat 47 defined on valve body 36 and extending upwardly into the cavity of body 36 is adapted to coact with the seal disc 45 in the closed position of the valve, as shown in FIG. 2, and the stem 46 is slidable in a guide bore 48 defined in an axially elongated portion of the cover plate 38, being sealed relative thereto by an O-ring 50 carried in a circumferential groove defined on the stem 46. The periphery of the float valve disc 44 constitutes a piston that is adapted particularly to cooperate with a counterbore 49 defined in body 36 and concentric with valve seat 47 and which serves as a cylinder to take advantage of the hydraulic multiplication factor herinbefore referred to and which will be elaborated upon later in our specification.

A float valve lever 52 is provided having an intermediate portion thereof bifurcated and pivoted on a pivot pin 54 carried by a fulcrum ear 56 extending upwardly from the cover plate 38. The outer end of lever 52 is tapped to receive the float rod 16. The float valve lever 52 has a smoothly rounded protuberance 58 adapted to coact with the upper end of the stem 46 for moving the float valve 44 toward its seat 47 as the lever 52 is rotated clockwise (FIG. 2) about the pivot pin 54. The valve body 36, its cover plate 38, the float valve 46–44 and the float valve lever 52 are preferably formed of material such as "Delrin" (a plastic material by Du Pont that does not change its dimensions when immersed in water) instead of metal as in the usual construction of ball cock assemblies, and thereby eliminating any possibility for rust or corrosion effecting malfunctioning of the assembly. The supply shank 22 may be formed of either metal or plastic material.

With respect to the special construction of the supply shank 22, an annular check valve seat 60 of copper or the like is mounted therein against which an anti-siphon valve closure element 62 (in the form of a ball) seats. The ball 62 may be of metal, or may be of plastic of sufficient specific gravity for proper seating on the ring-like seat 60. Above the seat 60 are a plurality of axially elongated guide ribs 64 projecting radially inwardly from the inner surface of the shank, and when water is flowing upwardly through the standpipe 18, due to the float valve being in the open position, the ball 62 is raised by the flow of water to the dotted-line position shown in FIG. 2 to permit free and unrestricted flow of water. The ribs 64 extend upwardly from seat 60 in parallel arrangement and then turn inwardly and tend to converge thereby defining a restraint for upward movement of ball 62.

The valve body 36 is laterally enlarged and within the hollow of said valve body 36, in laterally offset relation to valve disc 44, is an anti-siphon valve 66 comprising an elongated stem 68 formed integral with a disc 71 of plastic material. Mounted on stem 68 against disc 71 is a resilient seal washer 70 that is adapted to engage and seal against seat 38a defined on cover 38. On the free end of stem 68 is a retaining cover member 72 that is of inverted cup shape and is larger than the opening 76 in which the stem 68 moves and through which air enters to the interior of body 36. The inverted cup 72 is retained against a shoulder on stem 68 by a C-shaped retainer ring 74. The stem 68 is centered within opening 76 in the cover plate 38 by three radial ribs 77, as best seen in FIG. 5. The downward movement of disc 70 is limited by a plurality of studs 78.

*Practical operation*

In the operation of our ball cock assembly, lowering of the level of the water 79 in the tank 10 from the level L shown in FIG. 1 due to opening of the flush valve 28 results in counterclockwise rotation of the float valve lever 52 about the pivot pin 54 thus permitting the incoming water pressure in the standpipe 18 to unseat the float valve 44. The water, upon entering the valve body 36, acts on the anti-siphon valve 66 to close its seal washer 70 against the under surface of the cover plate 38 so that the water does not flow through the valve bore 76 but instead flows downwardly through the discharge pipe 37 and into the flush tank 10.

When the flush valve 28 closes, the incoming water from pipe 18 will accumulate in the tank and eventually raise the float 14 to act against stem 46 to start cutting off the water supply at the float valve 45–47. The float 14 will float high in the water because of small resistance to its upward progress by the valve 44–45 but there will be increased resistance to its progress as the disc 44 enters cylinder 49 and approaches the seat 47. About $\frac{1}{16}''$ before seating the disc 44, acting as a piston, has entered the cylinder 49, as shown in FIG. 3, which increases the water pressure against the underside of disc 44 to almost full water inlet pressure.

Before such entry, the water pressure against the underside of disc 44 is limited to the pressure in the valve body cavity. After entry of disc 44 into cylinder 49 the water pressure acting against the underside of disc 44 increases to almost full line pressure due to the small annular clearance between the disc 44 and the cylinder 49. Accordingly greater force is then required from the float 14 to move the valve disc 44 toward the valve seat 47. The increase in force from float 14 is achieved by requiring a higher level of water in tank 10 so as to obtain greater buoyant force on float 14, which greater force in FIG. 1 may be represented by the higher water level $L^1$. Now, as soon as the disc 44 does close against seat 47 there will be an immediate build-up of seating pressure on the disc against the seat 47, because the area against which the water pressure is acting has suddenly decreased, changing from $A^2$ to $A^1$. Thus the valve is held firmly seated by a greater force represented by the submersion of the float 14 to the higher level $L^1$ as distinguished from the usual valve-closing water level $L^2$ which would be the case if the piston 44 and cylinder 49 were not provided in the relative positions and proportions illustrated and operating in the manner described. The difference in water levels $L^1$ and $L^2$ is distorted in FIG. 1 merely to bring out this important feature.

The diameters of $A^2$ and $A^3$ of FIG. 3 preferably should be about .010 inch to .020 inch different in size, and this limited dimensional difference, or clearance, between the periphery of the disc 44 and the bore 49 acts as a controlling orifice. When the disc 44 nears the seat 47 this controlling orifice causes the area $A^2$ to become effective to increase the float valve closing force so that there is achieved a greater seating force than would normally occur, thus full closing, and remaining closed is insured, thereby preventing objectionable noises as occur when faulty closing is obtained.

Now, in order to obtain this improvement in valve seating, the float has to exert a force equal to the large disc area ($A^2$) times the incoming water pressure. The float continues to rise until the disc 44 touches the seat whereupon the force acting on the float is now only area $A^1$ times the pressure, and the difference in the two forces is the additional seating force. This gives a very effective shut-off, and if the seat 47 is not perfect, the protruding resilient seal disc may deform to still provide a complete seal, while a standard unit would not since it provides only a touch-type seal at a normal seating, lower level $L^2$. The float of course obtains its additional closing force by the buoyance thereof relative to the water, and what we really have done is delayed closure of the valve seat 47, thereby causing an excess of water to enter tank 10 and caused a water rise to level $L^1$ above the equilibrium point $L^2$ normally obtained with a standard ball cock, thus using its added buoyant force to effect a greater sealing force.

As to the operation of the anti-siphoning feature of our ball cock assembly, it will be understood that the valve body 36 is normally above the water level in tank 10 and above the upper open end of pipe 34. After valve 47 is closed, the water remaining in the hollow body 36 bleeds through restricted drain tube 82 into tube 34 for discharge through connection 35. The valve 66 then falls to provide an opening to atmosphere, thereby serving as a vacuum breaker and preventing possible siphoning of water from pipe 37 through body 36. Now, in the event that water drains from the supply pipe 20, as by cut-off of the water supply coupled with the opening of a faucet at a level lower than the flush tank 10 (at a time when the float valve 45–47 is closed due to the flush tank 10 being in filled condition) the ball 62 will immediately seat and seal on the ring 60 to prevent any possibility of water from tube 18 and from the ball cock assembly flowing back into the supply pipe and contaminating the water supply. The anti-siphoning valve 60–62 is normally sufficient to take care of the conditions just mentioned.

Now, when the tank in which the ball cock assembly is located is being filled, there exists possible contamination of the system in the event a vacuum is created. However, with the construction as aforedescribed, under such occurrence of a vacuum, during the period when the tank is being filled, and with the seal disc 45 raised, there conceivably is a possibility that some liquid might be drawn up from tube 37 that might enter or contaminate the fluid in tube 18 through which the fresh water is entering. Under this latter situation, any vacuum occurring in the system that would operate on tube 37 will also act to suck air in past the inverted cup 72 and through opening 76 to the interior of the body 36, thereby breaking the vacuum. The ball 62 serves as a combination check valve and anti-siphon valve, and to provide an added safety feature because, in the event that the valve 68 fails to supply enough air therethrough to eliminate the vacuum in tube 37, the ball 62 seats against valve seat 60 and shuts the vacuum off completely, thus eliminating the vacuum.

The studs 78 defined in body 36 serve as a stop to limit the opening movement of valve 66 so that the cup 72 is normally spaced above the upper surface of the cover plate 38 as shown in FIG. 2 to permit freer flow of air thereunder through the opening 76.

Some changes may be made in the construction and arrangement of the parts of our ball cock assembly without departing from the real spirit and purpose of our invention, and it is our intention to cover by our claims any modified forms of structure or use of mechanical equivalents which may reasonably be included within their scope.

We claim as our invention:

1. A float valve for a float actuated ball cock assembly, said float valve comprising a valve body having a valve seat, a float actuated closure element adapted to seat thereon, said closure element having a piston-like portion of greater area than the area of said valve seat, said valve body, defining a cylinder-like portion of slightly greater area than the area of said piston-like portion, which surrounds said valve seat and projects axially a relatively small distance beyond said valve seat in a direction to receive therein the piston-like portion as it moves toward said valve seat, said cylinder-like portion being constructed and arranged to receive the piston-like portion and to provide a restriction to flow of water through the annular space defined therebetween sufficient to effect retardation of movement and seating of said closure element on the valve seat during the final portion only of the closing movement of said closure element relative to said valve seat, whereby the water flowing from said valve seat acts on said piston-like portion within said cylinder-like portion of greater area than said valve seat to increase the force required from said float to close said closure element on said seat and after closure applies the resulting additional force in opposition to only the water pressure acting on a reduced area defined by said valve seat.

2. A float valve in accordance with claim 1 wherein said float actuated closure element has a stem slidable through a wall of said valve body, and sealing means being provided between said stem and said valve body.

3. A ball cock assembly comprising a valve body having a valve seat surrounding an inlet to said valve body, axially aligned outlet and vent openings, in said valve body downstream of said valve seat, a float actuated closure element adapted to seat on said valve seat, said element having a disc-like portion of greater area than the area of said valve seat, said valve body defining a cylinder-like portion of slightly greater area than the area of said disc-like portion, which surrounds said valve seat and projects axially a relatively small distance beyond said valve seat in a direction to receive therein the disc-like portion as it moves toward said valve seat, said cylinder-like portion being constructed and arranged to receive said disc-like portion during the final closing movement only of said closure element relative to said valve seat and to provide a restriction to flow of water through the annular space defined between said cylinder-like portion and said disc-like portion to effect retardation of movement and seating of said closure element on the valve seat, and antisiphon valve means in said valve body on the downstream side of said float valve comprising a valve which opens the interior of said float valve body to atmosphere upon cessation of water flow and during siphoning conditions obtaining in the system and which closes under pressure of water flowing into the valve body through either the inlet or outlet openings.

4. A float valve for a ball cock assembly that receives water whose entry is under pressure and is float controlled, said float valve comprising, in combination, hollow valve body means defining a water receiving chamber therein bounded by spaced upper and lower walls, the lower wall having an inlet aperture through which water under pressure enters into said chamber and an inlet valve seat surrounding said inlet aperture, the lower wall defining a cylindrical recess surrounding said inlet valve seat and which extends axially toward said upper wall a relatively small distance above said valve seat, a disc-like closure element defining a piston-like portion of greater area than the inlet valve seat and only slightly smaller than the area of the cylindrical recess, said closure element being movable within said hollow valve body and being constructed and arranged to have said piston-like portion thereof enter said cylindrical recess just prior to seating against said inlet valve seat and to thereby provide a restriction to flow of water through the annular space defined between said piston-like portion and said cylindrical recess, whereby during only the final portion of the closing movement of the closure element the water flowing through said inlet aperture acts upon said piston-like portion within said cylindrical recess to require increase in the force from a float actuator to effect closure of the inlet valve seat and after such closure the said increased force from the float actuator is resisted by only a sharply reduced force tending to unseat the closure element, and float-operated actuator means for moving the closure element toward the inlet valve seat.

5. A valve as in claim 4 including an aperture in said upper wall aligned with said inlet aperture, an elongated stem on said closure element slidably extending upwardly through said aligned aperture in the upper wall and presenting its end above said upper wall, and said float-operated actuator means including a lever pivoted on the upper wall of said valve body and providing a sliding bearing contact between the lever and the upper end of the stem, to effect control of the closure element.

6. A valve as in claim 4 wherein the hollow valve body provides a pair of aligned apertures in said spaced upper and lower walls offset laterally relative to said inlet aperture and each communicating with said chamber, the said aligned aperture in the lower wall providing for water discharge from the valve body, the said aligned aperture in the upper wall being a vent aperture, and a disc-like closure element in said chamber normally in an inoperative position spaced between said pair of aligned apertures but adapted to be actuated by pressure of liquid entering said chamber through either aperture in the lower wall to move toward closing said vent aperture.

References Cited in the file of this patent

UNITED STATES PATENTS

| | | |
|---|---|---|
| 2,290,438 | Kohlmeyer | July 21, 1942 |
| 2,324,084 | Homer | July 13, 1943 |
| 2,722,229 | Wentz | Nov. 1, 1955 |
| 2,761,468 | Thatcher | Sept. 4, 1956 |
| 2,862,514 | Curtin | Dec. 2, 1958 |
| 3,005,616 | Seele | Oct. 24, 1961 |
| 3,104,674 | Bills et al. | Sept. 24, 1963 |